United States Patent [19]
Wouden

[11] 4,449,656
[45] May 22, 1984

[54] LOAD CARRIER FOR VEHICLES

[75] Inventor: Adriaan v. d. Wouden, Ulvenhout, Netherlands

[73] Assignee: Industri AB Thule, Hillerstorp, Sweden

[21] Appl. No.: 484,967

[22] Filed: Apr. 14, 1983

[30] Foreign Application Priority Data

Apr. 21, 1983 [SE] Sweden .................................. 8202491

[51] Int. Cl.³ ................................................ B60R 9/04
[52] U.S. Cl. ..................................... 224/320; 224/329; 224/331
[58] Field of Search ............... 224/329, 314, 320, 321, 224/331

[56] References Cited

U.S. PATENT DOCUMENTS

| 2,983,414 | 5/1961 | Fehr | 224/320 X |
|---|---|---|---|
| 3,385,488 | 5/1968 | Bronson | 224/331 |
| 3,495,750 | 2/1970 | Oliveira | 224/320 |
| 4,354,625 | 10/1982 | Peoples | 224/329 |

Primary Examiner—Steven M. Pollard
Attorney, Agent, or Firm—Howson and Howson

[57] ABSTRACT

A luggage carrier of the kind comprising a support rod and support legs connected with the ends thereof, the support legs having fastening devices for fastening the luggage carrier to a vehicle, preferably the rain gutter of the roof of the vehicle.

The support rod of the luggage carrier is constituted by at least two concentrically positioned portions (18, 20) which are concentrically displaceable in relation to each other for allowing adjustment of the length of the support rod and thereby that the luggage carrier is adapted to the width of the vehicle. The support rod can be dismounted or pushed together to a space-saving position of the luggage carrier. The luggage carrier comprises a locking device for securing the portions of the support rod in a desired relative position.

According to the invention the securing device is constituted by two complementary securing means (24-30; 32) each connected with separate portions (18, 20) of the support rod. At least one of the locking means (24-30) of the locking device is securable to the portion (20) of the support rod belonging thereto to a desired position of the length of said portion of the support rod with regard to the desired relative position between the portions of the support rod when the locking means of the locking device are in engagement with each other.

5 Claims, 3 Drawing Figures

LOAD CARRIER FOR VEHICLES

The present invention relates to a luggage carrier for vehicles, comprising a support rod and support legs which are connected with the ends of the support rod and have fastening devices for fastening the luggage carrier to a vehicle, preferably the rain gutters of the vehicle roof.

Luggage carriers of this kind are to an increasing extent used for supporting and holding roof racks, ski-carriers, carriers for surf-boards and so on at the vehicle roofs. Such luggage carriers are a simple and advantageous means for allowing the transportation of bulky objects by means of passenger cars.

Because of the increasing fuel costs the attention has been drawn to the increase of the air resistance and thereby of the fuel consumption which is caused by the luggage carriers. Therefore, it is important that the luggage carriers are positioned on the roofs of the vehicles only when the luggage carriers are used. Thus, it is desirable to provide a luggage carrier for vehicles which requires a small space when not being used, so that the luggage carrier constantly can be carried in the luggage compartment of the vehicle in order to be available for mounting on the roof of the vehicle only when required.

In order to provide this it is previously known to connect the support legs of a luggage carrier to the support rod in a pivotable manner so that the support legs can be pivoted between a space-saving storage postition in which the support legs are folded against the support rod and an operative position in which the support legs extend transversely of the support rod. It is also previously known to construct the support rod of the luggage carrier in such a way that it comprises two concentrically positioned portions which are displaceable in relation to each other in order to allow an adjustment of the length of the support rod and thereby that the luggage carrier is adapted to the width of the vehicle. This construction of the support rod also makes it possible to dismount the support rod or to telescope the portions of the luggage carrier to a space-saving position. Thereby, the luggage carrier comprises a locking device for securing the two portions of the luggage carrier in the desired position in relation to each other.

Even if the above construction of the luggage carrier makes it possible to adapt the luggage carrier in a storage position when not being used, in which position the luggage carrier requires a small space, it represents a drawback of this previously known construction of the luggage carrier that it is necessary to adjust the support rod to the correct position in relation to the width of the vehicle every time the luggage carrier shall be mounted on the vehicle after having been dismounted or pushed together to the storing position.

The object of the invention is to provide a luggage carrier for vehicles in which the lastmentioned drawback is obviated.

In order to comply with this object the luggage carrier according to the invention comprises a locking device for securing the two portions of the support rod in a desired position in relation to each other, said locking device comprising two complementary members which are each connected with one of the portions of the support rod and are adapted to secure the portions of the support rod in relation to each other when the members engage each other and to allow that the support rod is dismounted and/or pushed together when the members are out of engagement with each other, the luggage carrier being characterized in that at least one of said members of the locking device is secureable to its portion of the support rod in a desired position of the length of said portion with regard to the desired relative position of the portions of the support rod when the members of the locking device are in engagement with each other.

Thus, in a luggage carrier according to the invention the length of the support rod and thereby the size of the luggage carrier with regard to the width of the vehicle is adjusted by securing said member of the locking device in relation to the portion of the support rod belonging thereto in a desired position of the length of said portion, said position being chosen so that the portions of the support rod take a desired position in relation to each other when the members of the locking device are in engagement with each other. Thereupon, it is possible to dismount the support rod or to push the support rod together by disengaging the members of the locking device from each other in order to arrange the luggage carrier in a space-saving storage position and to arrange the luggage carrier in its operative position by mounting or extract the support rod, the support rod thereby automatically taking the previously adjusted correct length with regard to the width of the vehicle when the members of the locking device reach their engagement position.

In a preferred embodiment of the invention the two complementary members of the locking device are constituted by a section forming an opening in one of the portions of the support rod and an element securable to the other portion of the support rod and having a portion insertable in said opening.

The invention is described in the following with reference the accompanying drawings.

Figure 1:
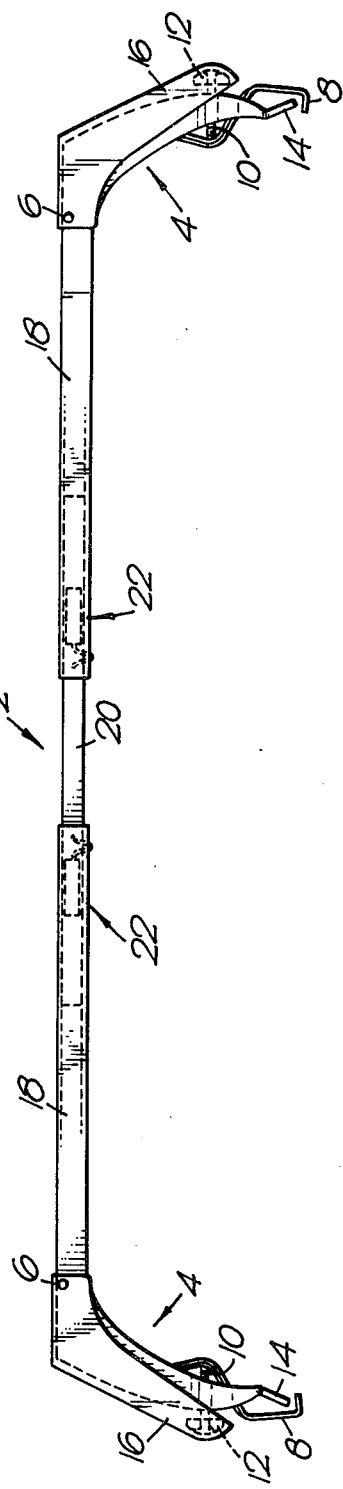
FIG. 1 shows an embodiment of a luggage carrier according to the invention.
Figure 2:
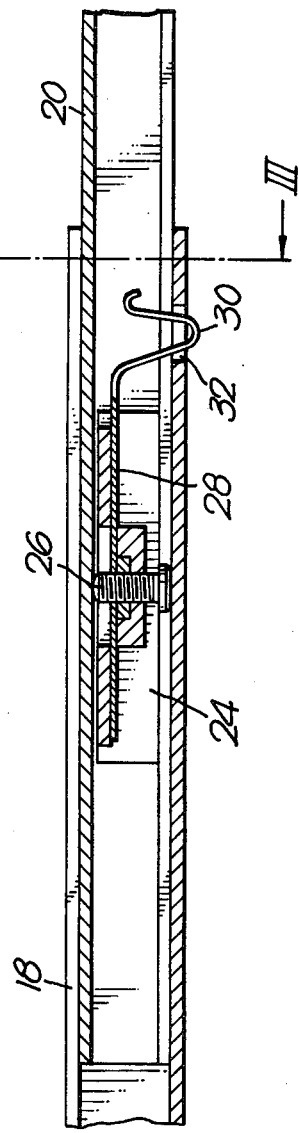
FIG. 2 is a partial section of a portion of the luggage carrier shown in FIG. 1 on an enlarged scale.
Figure 3:
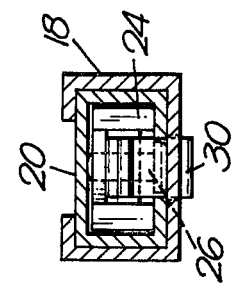
FIG. 3 is a cross-section on line III—III of FIG. 2.

A luggage carrier acccording to the invention comprises a support rod 2 and two support legs 4 connected with the ends of the support rod. The support legs 4 are adapted to be connected with the rain gutters of the roof of a vehicle, so that the support rod 2 extends transversely of the roof of the vehicle. Usually a vehicle is provided with two luggage carriers which are mounted at a distance from each other in the longitudinal direction of the vehicle. Thereby, the luggage carrier can be used for supporting a roof rack, ski-carriers, carriers for surf-boards, carriers for bicycles and so on.

The support rod 2 is connected with the support legs 4 by means of pivot pins 6 making it possible to pivot the support legs 4 against the support rod 2 to a space-saving position. The luggage carrier is provided with means (not shown) for securing the support legs 4 in the operative position in which the support legs extend transversely of the support rod. At its lower end the support legs 4 have fastening devices each comprising a hook 8 and a clamping bolt 10. Each clamping bolt 10 has a knob 12. Each support leg 4 has an end portion 14 which is adapted to engage a rain gutter at the side of the roof of the vehicle, while the hook 8 of each support leg is adapted to engage with the lower side of the rain gutter in order to secure the support leg thereto. By means of the knob 12 it is possible to rotate the clamping bolt 10 belonging thereto for fastening the support legs 4 to the rain gutter.

At each end the luggage carrier is provided with a protective cover 16 which in a manner which is not shown in detail is pivotably connected with the adjacent support leg 4. In accordance with FIG. 1 the protective covers 16 are in a position in which the knobs 12 are covered. As the protective covers 16 can be locked in the position shown it is possible to use the protective covers for obstructing operation of the knobs 12 in order to prevent that the luggage carrier is an unauthorized way removed from the vehicle. It is also possible to contruct the protective covers 16 so as to prevent the unauthorized removal of objects supported by the luggage carrier, for example ski-carriers, carriers for surfboards and so on.

In the embodiment shown in the drawings the support rod 2 of the luggage carrier according to the invention comprises three portions, namely two end portions 18 and an intermediate portion 20 connecting the two end portions. The end portions 18 are connected to the support legs 4 and has a substantially C-shaped cross-section. The end portions 18 are positioned with their open sides turned upwards for allowing that such accessories as for example ski-carriers can be connected with the support rod 2 in a simple way. Also the intermediate portion 20 has a substantially C-shaped cross-section and is of such size that it can be telescopically received in the end portions 18 in order to allow telescopic displacement between the end portions 18 and the intermediate portion 20. The intermediate portion 20 is positioned with the open side thereof turned downwards, that is so that the intermediate portion 20 opens against the web portion of the end portions 20.

Because of the fact that the end portions 18 and the intermediate portion 20 are telescopically displaceable in their longitudinal direction in relation to each other it is possible to adjust the distance between the support legs 4 of the luggage carrier with regard to the width of the vehicle to which the luggage carrier shall be fastened. The luggage carrier comprises locking devices 22 which are adapted to secure the end portions 18 in relation to the intermediate portion 20 in the adjusted relative position.

When the locking devices 22 are inoperative it is possible to dismount the luggage carrier by pusing the intermediate portion 20 out from the end portions 18 and pivoting the support legs 4 to a storage position adjacent the end portions 18. In this position the luggage carrier comprises three portions having small dimensions. Thereby it is possible to store the luggage carrier inside the vehicle withing a very small space.

In accordance with the invention the locking devices 22 are constructed automatically to secure the end portions 18 so in relation to the intermediate portion 20 that the luggage carrier obtains the correct distance between the support legs 4 in relation to the width of the vehicle when the luggage carrier is mounted. Thus, in accordance with the invention each locking device 2 comprises a block 24 having substantially the same cross-sectional size as the central space of the intermediate portion 20. Thus, the block 24 is displaceably positioned in the intermediate portion 20. The block 24 can be secured at the desired position in the intermediate portion 20 by means of a locking bolt 26 extending through a threaded portion of the block and being tightenable into engagement with the web portion of the intermediate portion 20. To the block 24 there is mounted an element 28 constructed as a plate spring and having a curved projecting portion 30. The portion 30 of the spring element is adapted to engage an opening 32 formed in the web portion of the end portion 20.

When the block 24 is secured in the intermediate portion 20 by means of the locking bolt 26 and the portion 30 of the spring element 28 engages the opening 32 in the end portion 18, the end portion 18 and the intermediate portion 20 are secured in relation to each other. By pressing the portion 30 of the spring element 28 it is possible to disengage the portion 30 from the opening 32 so that it is possible to dismount each end portion 18 from the intermediate portion 20 when it is desirable to dismount the luggage carrier to the storage position described above. Thus, in this storage position the blocks 24 are secured to the intermediate portion 20 at the ends thereof.

When mounting the luggage carrier it is only necessary to push the ends of the intermediate portion 20 into the end portions 18, whereby the portions 30 of the spring elements 28 are designed so as to move aside in a resilient way when being engaged by the edges of the end portons 18 and so as to snap into the openings 32 of the end portions 18 when the correct relative position between the end portions 18 and the intermediate portion 20 is reached.

Thus, it is recognized that is is possible to secure the blocks 24 of the locking devices 22 in such positions in the intermediate portion 20 that the correct relative position between the intermediate portion 20 and the end portions 18 and thereby the correct distance between the support legs 4 is automatically obtained every time the luggage carrier is mouted from the dismounted storage position.

The invention can be modified within the scope of the following claims. For example it can be possible to use only one locking device of the adjustable type while the other locking device is of the non-adjustable type.

I claim:

1. A luggage carrier for vehicles comprising a support rod (2) and support legs (4) connected with the ends of the support rod, the support legs having fastening devices (8,10) for fastening the luggage carrier to a vehicle, the support rod (2) comprising two telescoping portions (18,20) which are telescopically displaceable in relation to each other in order to allow adjustment of the length of the support rod whereby the luggage carrier may be adapted to the width of the vehicle, and to allow the support rod to be dismounted or its portions to be pushed together to a space-saving relationship, the support rod also comprising a locking device (22) for securing the two portions of the support rod in the desired relative position, said locking device comprising two complementary, interengageable locking means (20, 30, 32), one of said locking means being on and belonging to each of the portions (18, 20) of the support rod, for securing the portions of the support rod in fixed relation to each other when the locking means are in engagement with each other and allowing the support rod to be dismounted or its portions to be pushed together when the locking means are out of engagement with each other, characterized by means for securing at least one (24-30) of the locking means of the locking device (22) to the portion (20) of the support rod (2) belonging thereto at any desired position within a range of positions along the length of the last-mentioned portion regardless of the relative positions of the two telescoping portions and regardless of whether or not the two portions of the support rod are secured together by the locking device, whereby the relative position of the portions of the support rod when the locking means of the locking device engage each other can be established by securing said one of the locking means to its portion of the support rod before installation of the luggage carrier on a vehicle.

2. A luggage carrier as claimed in claim 1, characterized in that the two complementary interengageable locking means of the locking device (22) are constituted by a section forming an opening (32) in one of the portions (18) of the support rod and an element (28) securable to the other portion (20) of the support rod and having a portion (30) introduceable in said opening.

3. A luggage carrier as claimed in claim 2, characterized in that the element having a portion which is introduceable in the opening (32) is constituted by a leaf spring (28).

4. A luggage carrier as claimed in any one of claims 1–3, characterized in that one of the two complementary locking means is securable to the portion (20) of the support rod belonging thereto by means of a locking bolt (26).

5. A luggage carrier according to claim 1 in which said at least one of the locking means of the locking device is securable to the portion (20) of the support rod (2) belonging thereto at any desired position within a continuous range of positions along the length of the last-mentioned portion.

* * * * *